US008842331B1

(12) United States Patent
Enge

(10) Patent No.: US 8,842,331 B1
(45) **Date of Patent: *Sep. 23, 2014**

(54) MULTI-PRINT HEAD PRINTER FOR DETECTING ALIGNMENT ERRORS AND ALIGNING IMAGE DATA REDUCING SWATH BOUNDARIES

(71) Applicant: James Michael Enge, Spencerport, NY (US)

(72) Inventor: James Michael Enge, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,679

(22) Filed: Mar. 25, 2013

(51) Int. Cl.

| | |
|---|---|
| ***G06F 15/00*** | (2006.01) |
| ***H04N 1/46*** | (2006.01) |
| ***G06K 15/00*** | (2006.01) |
| ***G06K 15/02*** | (2006.01) |

(52) U.S. Cl.
CPC .................................... *G06K 15/027* (2013.01)
USPC ............. 358/1.8; 358/1.4; 358/502; 358/504; 358/3.23

(58) Field of Classification Search
CPC ... G06K 15/10; G06K 15/102; G06K 15/105; G06K 15/107; G06K 2215/101; G06K 2215/111; B41J 2/2135; B41J 2/2139; B41J 2/2142; B41J 2/04505
See application file for complete search history.

(56) References Cited

U.S. PATENT DOCUMENTS

| | | | |
|---|---|---|---|
| 4,721,969 A | 1/1988 | Asano | |
| 4,977,410 A | 12/1990 | Onuki et al. | |
| 5,093,674 A | 3/1992 | Storlie | |
| 5,450,099 A | 9/1995 | Stephenson et al. | |
| 5,505,129 A | 4/1996 | Greb et al. | |
| 6,068,362 A | 5/2000 | Dunand et al. | |
| 6,362,847 B1 | 3/2002 | Pawley et al. | |
| 6,663,206 B2 | 12/2003 | Taylor | |
| 6,927,875 B2 | 8/2005 | Ueno et al. | |
| 7,118,188 B2 | 10/2006 | Vilanova et al. | |
| 7,871,145 B1 | 1/2011 | Enge | |
| 8,104,861 B2 | 1/2012 | Saettel | |
| 8,123,326 B2 | 2/2012 | Saettel et al. | |
| 8,393,709 B2 | 3/2013 | Enge | |
| 2007/0172270 A1 | 7/2007 | Jorgens et al. | |
| 2011/0012949 A1 * | 1/2011 | Enge | 347/12 |
| 2011/0102851 A1 | 5/2011 | Baeumler | |

FOREIGN PATENT DOCUMENTS

| | | |
|---|---|---|
| EP | 0729846 A2 | 2/2000 |

* cited by examiner

*Primary Examiner* — Benny Q Tieu
*Assistant Examiner* — Haris Sabah
(74) *Attorney, Agent, or Firm* — Kevin E. Spaulding

(57) ABSTRACT

A multi-printhead printing system, including first and second printheads adapted to print on a receiver medium. An alignment process includes printing a test pattern including features separated by predefined test pattern feature separations, where some features are printed with a first printhead and some features printed with a second printhead. An image of the printed test pattern is analyzed to determine a first camera pixel separation between two features printed with the first printhead, which is used to determine a camera scale factor. The camera scale factor is used to scale a second camera pixel separation between a feature printed with first printhead and a feature printed with the second printhead. The scaled second camera pixel separation is compared to a corresponding test pattern feature separation to determine an alignment error, which is used to adjust the alignment of the image data printed with at least one of the printheads.

9 Claims, 7 Drawing Sheets

MULTI-PRINT HEAD PRINTER FOR DETECTING ALIGNMENT ERRORS AND ALIGNING IMAGE DATA REDUCING SWATH BOUNDARIES

CROSS-REFERENCE TO RELATED APPLICATIONS

Reference is made to commonly assigned, co-pending U.S. Patent Application Ser. No. 13/849,664, entitled: "Alignment method for multi-printhead printers", by Enge, which is incorporated herein by reference.

FIELD OF THE INVENTION

This invention pertains to the field of digital printing and more particularly to a method for aligning printed image data in a multi-printhead printer.

BACKGROUND OF THE INVENTION

FIG. 1 shows a diagram illustrating an exemplary multi-channel digital printing system 10 for printing on a web of receiver medium 14. The printing system 10 includes a plurality of printing modules 12, each adapted to print image data for an image plane corresponding to a different color channel. In some printing systems 10, the printing modules 12 are inkjet printing modules adapted to print drops of ink onto the receiver medium 14 through an array of inkjet nozzles. In other cases, the printing modules 12 can be electrophotographic printing modules that produce images by applying solid or liquid toner to the receiver medium 14. Alternately, the printing modules 12 can utilize any type of digital printing technology known in the art.

In the illustrated example, the printing modules 12 print cyan (C), magenta (M), yellow (Y) and black (K) colorants (e.g., inks) onto the receiver medium 14 as it is transported through the printing system using a media transport system (not shown in FIG. 1) from an upstream to a downstream in a receiver motion direction 16. (The receiver medium direction 16 is commonly referred to as the "in-track direction," and the direction perpendicular to the receiver medium direction 16 is commonly referred to as the "cross-track direction.") In other cases, the printing modules 12 can be adapted to print different numbers and types of colorants. For example, additional printing modules 12 can be used to print specialty colorants, or extended gamut colorants. In some cases, a plurality of the printing modules 12 can be used to print the same colorant (e.g., black), or density variations of the same color (e.g., gray and black). In some cases, the printing system 10 is adapted to print double-sided pages. In this case, one or more of the printing modules 12 can be arranged to print on a back side of the receiver medium 14.

The printing system 10 also includes dryers 18 for drying the ink applied to the receiver medium 14 by the printing modules. While the exemplary printing system 10 illustrates a dryer 18 following each of the printing modules 12, this is not a requirement. In some cases, a single dryer 18 may be used following the last printing module 12, or dryers 18 may only be provided following some subset of the printing modules 12. Depending on the printing technology used in the printing modules 12, and the printing speed, it may not be necessary to use any dryers 18.

Downstream of the printing modules 12, an imaging system 20, which can include one or more imaging devices 22 is used for capturing images of printed images on the receiver medium 14. In some cases, the imaging system 20 can include a single imaging device 22 that captures an image of the entire width of the receiver medium 14, or of a relevant portion thereof. In other cases, a plurality of imaging devices 22 can be used, each of which captures an image of a corresponding portion of the printed image. In some embodiments, the position of the imaging devices 22 can be adjusted during a calibration process to sequentially capture images of different portions of the receiver medium 14. For cases where the printing system 10 prints double-sided images, some of the imaging devices 22 may be adapted to capture images of a second side of the receiver medium 14.

In some cases, the imaging devices 22 can be digital camera systems adapted to capture 2-D images of the receiver medium 14. In other embodiments, the imaging devices 22 can include 1-D linear sensors that are used to capture images of the receiver medium 14 on a line-by-line basis as the receiver medium 14 moves past the imaging system 20. The imaging devices 22 can equivalently be referred to as "cameras" or "camera systems" or "scanners" or "scanning systems," independent of whether they utilize 2-D or 1-D imaging sensors. Similarly, the images provided by the imaging devices 22 can be referred to as "captured images" or "scanned images" or "scans." In some cases, the imaging devices 22 include color sensors for capturing color images of the receiver medium, to more easily distinguish between the colorants deposited by the different printing modules 12.

FIG. 2 is a diagram of an exemplary printing module 12. In this configuration, the printing module 12 is an inkjet printing system that includes a plurality of inkjet printheads 30 arranged across a width dimension of the receiver medium 14 in a staggered array configuration. (The width dimension of the receiver medium 14 is the dimension perpendicular to the receiver motion direction 16.) Such inkjet printing modules 12 are sometimes referred to as "lineheads."

Each of the inkjet printheads 30 includes a plurality of inkjet nozzles arranged in nozzle array 31, and is adapted to print a swath of image data in a corresponding printing region 32. In the illustrated example, the nozzle arrays 31 are one-dimensional linear arrays, but the invention is also applicable to inkjet printheads 30 having nozzles arrayed in two-dimensional arrays as well. Common types of inkjet printheads 30 include continuous inkjet (CI) printheads and drop-on-demand (DOD) printheads. Commonly, the inkjet printheads 30 are arranged in a spatially-overlapping arrangement where the printing regions 32 overlap in overlap regions 34. Each of the overlap regions 34 has a corresponding centerline 36. In the overlap regions 34, nozzles from more than one nozzle array 31 can be used to print the image data.

Stitching is a process that refers to the alignment of the printed images produced from multiple printheads 30 for the purpose of creating the appearance of a single page-width line head. For example, as shown in FIG. 2, six printheads 30, each three inches in length, can be stitched together at overlap regions 34 to form an eighteen inch page-width printing module 12. The page-width image data is processed and segmented into separate portions that are sent to each printhead 30 with appropriate time delays to account for the staggered positions of the printheads 30. The image data portions printed by each of the printheads 30 is sometimes referred to as "swaths." Stitching systems and algorithms are used to determine which nozzles of each nozzle array 31 should be used for printing in the overlap region 34. Preferably, the stitching algorithms create a boundary between the printing regions 32 that is not readily detected by eye. One such stitching algorithm is described in commonly-assigned U.S. Pat. No. 7,871,145 to Enge, entitled "Printing method for reducing stitch error between overlapping jetting modules," which is incorporated herein by reference.

One problem which is common in printing systems 10 that include a plurality of printheads 30 is alignment of the image data printed by the different printheads 30. There are a variety of different types of alignment errors that can occur. For color printing systems 10 having a plurality of different printing modules 12, the image data printed by one printing module 12 (e.g., a first color channel) can be misaligned with the image data printed by a second printing module 12 (e.g., a second color channel). These color-to-color alignment errors can occur in either or both of the in-track direction or the cross-track direction. Similarly, for printing modules 12 that include a plurality of printheads 30 the image data printed by one printhead 30 can be misaligned with the image data printed by a second printhead 30.

The alignment errors can result from a variety of different causes. In some cases, the alignment can result from variations in the geometry of the printheads 30 during manufacturing, and variations in the positioning of the printheads 30 within the printing system 10. In other cases, alignment errors can result from interactions between the printing system 10 and the environment (e.g., airflow perturbations can cause ink drops to be misdirected in inkjet printing systems). Another common source of misalignment is dimensional changes in the receiver medium 14 that can occur as the receiver medium 14 moves between different printing modules 12. For example, the absorption of water in the ink printed by one channel can cause the receiver medium 14 to expand before a subsequent channel is printed. Similarly, when the receiver medium 14 passes through a dryer, this can cause the receiver medium 14 to shrink. Such dimensional changes in the receiver medium 14 will generally be a function of a variety of factors such as media type, image content of the printed image, and environmental conditions. Dimensional changes can also result from other types of processing operations that are performed between the printing of one channel and another. For example, in an electrophotographic printing system, a fusing operation may be performed between the printing of a front side image and a back side image that can produce dimensional changes of the receiver medium 14.

A variety of different methods have been proposed in the prior art to detect and correct for alignment errors. Typically, the methods involve printing test patterns and capturing an image of the printed test pattern to characterize the alignment errors. Appropriate adjustments can then be made to correct for the alignment errors. In some cases, the adjustments can involve adjusting the physical positions of system components (e.g., the printing modules). In other cases, the adjustments can involve modifying the image data sent to the printheads 30 (e.g., by shifting the image data) or modifying time delays between the time that the image data is printed by one printhead 30 and the time that the corresponding image data is printed by another printhead 30.

Due to mechanical tolerances in the manufacturing process, it may be difficult to maintain an accurate alignment between the printheads 30 in a printing module 12. Moreover, even if the printheads 30 are perfectly aligned, differences in the aim of individual nozzles in the nozzle arrays 31 may make them appear to be misaligned in the printed image. Any such alignment errors can produce visible artifacts in the printed image.

Alignment errors between the printheads 30 in the cross-track direction can result in artifacts being produced at the boundaries between the printheads (e.g., dark streaks where the multiple nozzles print at the same location, or light streaks where no nozzles print at a particular location). Alignment errors between the printheads 30 in the in-track direction can result in artifacts being produced where portions of a linear feature in the image that spans the overlap region don't align with each other and appear to be broken.

U.S. Pat. No. 6,068,362 to Dunand et al., entitled "Continuous multicolor ink jet press and synchronization process for the press," discloses a method for synchronizing printheads of a printing system. The printing system includes a plurality of printheads with optical sensors mounted "before" each printhead (upstream) at some predetermined distance. A print media passes beneath the printheads in order to permit the printheads to print marks thereon. The optical sensors capture an image of the marks which are input into a synchronization circuit. The synchronization circuit determines whether any deviation from the desired target is present. If there is a deviation, the synchronization circuit modifies the line spacing of the printhead of interest in order to compensate for the inaccuracies. In this system, the adjusted line spacings are based on an output of an encoder attached to the paper drive motor. Such a system requires extremely high cost encoders to provide the resolution needed for the registration demands of a printer system. It also is subject to errors associated with slip or coupling between the motor and the motion of the paper through the print zone. This system is also very susceptible to errors produced by variations in motor speed such as wow and flutter. In this configuration, there is an inherent time lag from image capture until the media passes beneath the printhead. This time lag in and of itself introduces another variable which is also subject to deviation from its desired target.

European patent document EP0729846B1 by Piatt et al., entitled "Printed reference image compensation system," discloses a similar method for aligning the images for a plurality of different color channels in a multi-color printing system. Registration marks are printed in the margin of the image as the print media passes beneath each printhead. A camera positioned before a second printhead captures an image of the registration mark printed by a first printhead. This permits the second printhead to adjust its printing if a deviation in the expected position of the registration mark is detected from the captured image.

U.S. Pat. No. 7,118,188 to Vilanova et al., entitled "Hardcopy apparatus and method," makes use of the redundancy of nozzles in the overlap region 34 to correct for cross-track alignment errors. Different masks are provided that use different nozzles in the overlap regions 34. In some embodiments, an appropriate mask can be selected by measuring the width of the band artifact produced in the overlap regions 34 for a printed image. In other embodiments, a test pattern is printed which includes different areas corresponding to a set of masks. The optimal mask is then selected by visual evaluation or automatic evaluation with an optical scanner for use in subsequent printing operations.

Commonly-assigned U.S. Pat. No. 8,104,861 to Saettel et al., entitled "Color to color registration target," discloses a method for calibrating a multi-color inkjet printing system. A test target is printed that includes three marks printed with a first color in which two of the three marks are aligned along a first axis, and the third mark is offset by a predetermined distance along a second axis. The test target includes a fourth mark printed with a second color in which the intended position is aligned along the first axis with one of the first three marks, and is aligned along the second axis with another of the first three marks. The locations of the printed marks are detected and used to determine an appropriate alignment correction needed to align the first and second colors.

Commonly-assigned U.S. Pat. No. 8,123,326 to Saettel et al., entitled "Calibration system for multi-printhead ink systems," which is incorporated herein by reference, discloses a calibration method to correct for alignment errors in an inkjet printer having multiple printheads. The method includes printing a first test mark using a first printhead and a second test mark using a second printhead. The nominal positions of the first and second marks are separated by a predetermined spacing in the cross-track direction, and are aligned in the in-track direction. An image capture device is used to determine the positions of the printed marks, and an error factor is determined based on the position of the second mark relative to the first mark. The pulse train used to control the second printhead is shifted responsive to the error factor to correct in-track alignment errors. One limitation of this method is that the necessary separation between the first test mark and the second test mark in the cross-track direction means that the in-track alignment of the printed image data will only be perfectly corrected at those cross-track positions. This does not ensure that the printed image data will be perfectly aligned at the boundaries between the printheads (e.g., at centerlines 36 in FIG. 2).

There remains a need for an improved method for aligning image data printed on a receiver medium using two printheads in a multi-printhead printer that overcomes the limitations of the prior art.

SUMMARY OF THE INVENTION

The present invention represents a multi-printhead printing system, comprising:

first and second printheads adapted to print on a receiver medium;

a transport system adapted to move the receiver medium relative to the first and second printheads in an in-track direction;

a digital image capture device;

a data processing system;

a memory system communicatively connected to the data processing system and storing instructions configured to cause the data processing system to implement a method for aligning image data printed on the receiver medium using the first and second printheads, wherein the method includes:

- printing a test pattern including a plurality of features on the receiver medium using the first and second printheads as the receiver medium is moved relative to the printheads in an in-track direction, wherein some of the features in the test pattern are printed with the first printhead and some of the features in the test pattern are printed with the second printhead, wherein the features in the test pattern are separated by predefined test pattern feature separations;
- capturing a digital image of the printed test pattern on the receiver medium using the digital image capture device;
- analyzing the captured digital image to determine a first camera pixel separation between two features printed with the first printhead;
- determining a camera scale factor responsive to the determined first camera pixel separation and the corresponding test pattern feature separation;
- analyzing the captured digital image to determine a second camera pixel separation between a feature printed with first printhead and a feature printed with the second printhead;
- using the determined camera scale factor to scale the second camera pixel separation;
- comparing the scaled second camera pixel separation to the corresponding predefined test pattern feature separation to determine an alignment error; and
- using the determined alignment error to adjust the alignment of image data printed with at least one of the first and second printheads.

This invention has the advantage that alignment errors can be reduced at swath boundaries, thereby reducing the visibility of objectionable artifacts.

It has the additional advantage that the method is insensitive to variability in magnification of the digital imaging system used to digitize the printed test pattern.

Figure 1:
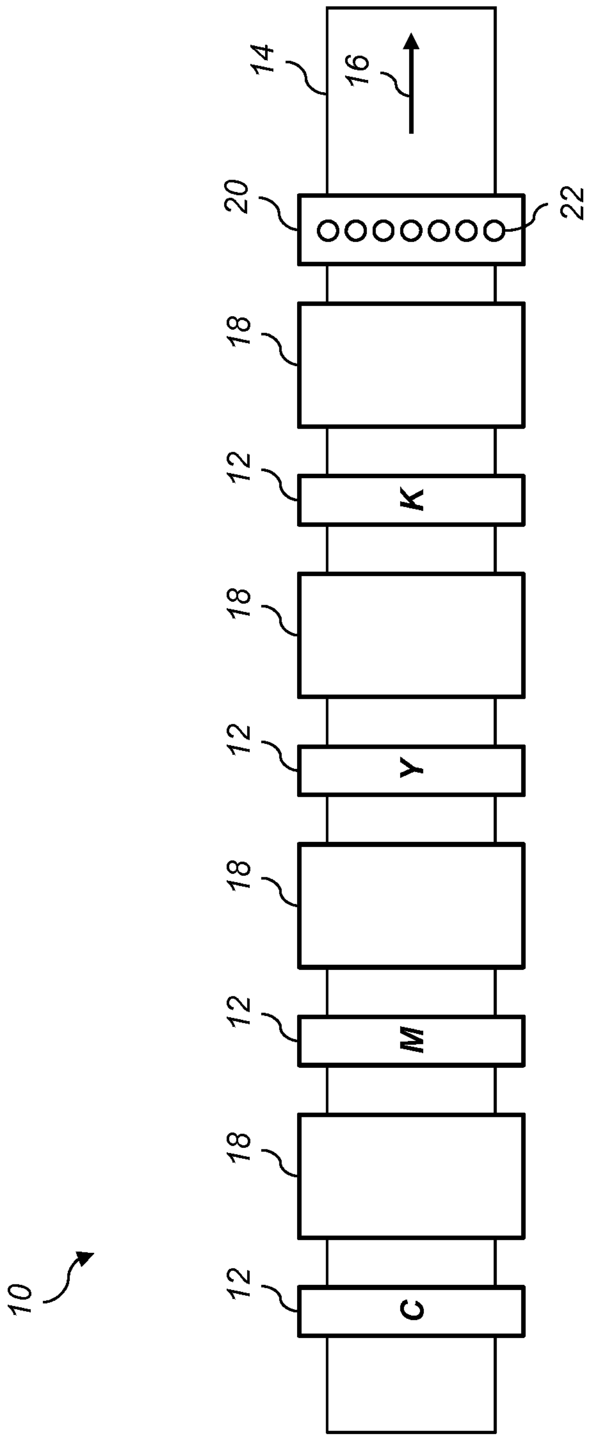
FIG. 1 (Prior Art)
FIG. 1 is a diagram illustrating an exemplary multi-channel digital printing system.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Commonly-assigned, co-pending U.S. patent application Ser. No. 13/599,067 to Enge et al., entitled "Aligning print data using matching pixel patterns," together with related U.S. patent application Ser. No. 13/599,067 and U.S. patent application Ser. No. 13/599,129, describe a method for aligning multi-channel digital image data for a digital printer having a plurality of printheads. A test pattern including test pattern indicia printed using individual printheads is scanned and analyzed to detect locations of the printed test pattern indicia. One of the printheads is designated to be a reference printhead, and one or more of the other printheads are designated to be non-reference printheads. Spatial adjustment parameters are determined for each of the non-reference printheads responsive to the detected test pattern indicia locations. Digital image data for the non-reference printheads is modified by designating an input pixel neighborhood within which an image pixel should be inserted or deleted, comparing the image pixels in the input pixel neighborhood to a plurality of predefined pixel patterns to identify a matching pixel pattern; and determining a modified pixel neighborhood responsive to the matching pixel pattern.

The present invention is well-suited for use in roll-fed inkjet printing systems, such as the printing system 10 described earlier with respect to FIG. 1, that apply colorant (e.g., ink) to a web of continuously moving receiver media 14. In such systems, the printheads 30 (FIG. 2) selectively moisten at least some portion of the receiver medium 14 as it moves through the printing system 10, but without the need to make contact with the print medium 14. While the present invention will be described within the context of a roll-fed inkjet printing system, it will be obvious to one skilled in the art that it could also be used for other types of multi-printhead printing systems as well, including sheet-fed printing systems and electrophotographic printing systems.

In the context of the present invention, the terms "web media" or "continuous web of media" are interchangeable and relate to a receiver medium 14 (e.g., a print media) that is in the form of a continuous strip of media that is transported through the printing system 10 in an in-track direction using a web media transport system from an entrance to an exit thereof. The continuous web media serves as the receiving medium 14 to which one or more colorants (e.g., inks or toners), or other coating liquids are applied. This is distinguished from various types of "continuous webs" or "belts" that are actually transport system components (as compared to the image receiving media) which are typically used to transport a cut sheet medium in an electrophotographic or other printing system. The terms "upstream" and "downstream" are terms of art referring to relative positions along the transport path of a moving web; points on the web move from upstream to downstream.

Additionally, as described herein, the example embodiments of the present invention provide a printing system or printing system components typically used in inkjet printing systems. However, many other applications are emerging which use inkjet printheads to emit liquids (other than inks) that need to be finely metered and deposited with high spatial precision. As such, as described herein, the terms "liquid" and "ink" and "colorant" can be taken to refer to any material that can be deposited by the printheads 30 described below. Likewise, the terms "printed image" and "print" can be taken to refer to any pattern of material deposited on a receiver medium.

In accordance with some exemplary embodiments the present invention, a timing delay between image data printed using a first printhead and corresponding image data printed by a second printhead is modified to provide improved alignment (e.g., in an in-track direction) between image content printed by the first and second printheads 30. In other embodiments, the digital image data provided to the first and second printheads 30 is modified to provide improved alignment (e.g., in a cross-track direction) between image content printed by first and second printheads 30. In other embodiments, a physical position of at least one of the first and second printheads 30 is adjusted to provide the improved alignment. In some cases, the first and second printheads 30 being aligned are in a single printing modules 12. In other cases, the first and second printheads 30 being aligned are in different printing modules 12 (e.g., to perform color-to-color alignment).

Figure 2:
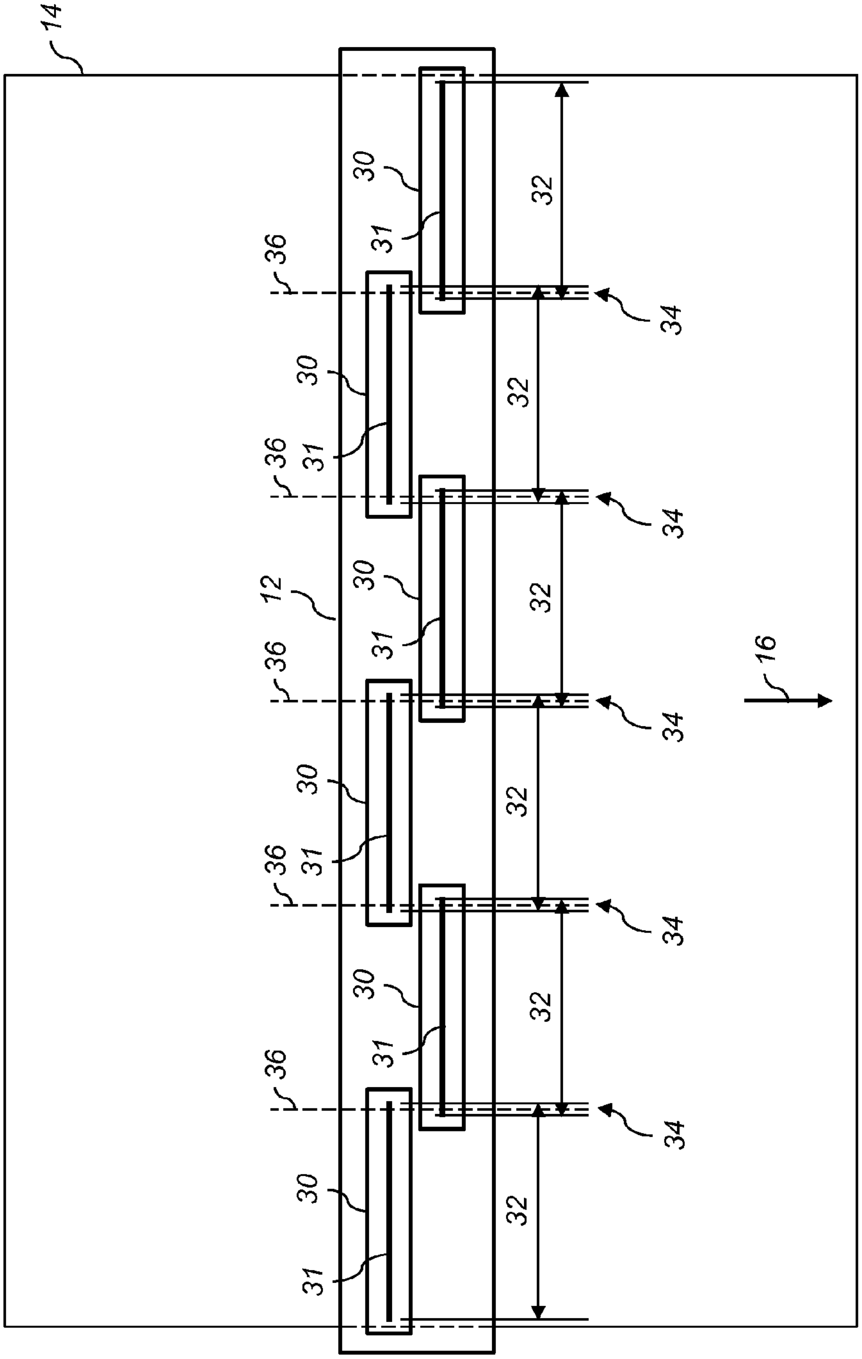
FIG. 2 (Prior Art)
FIG. 2 is a diagram showing an exemplary printing module having a plurality of printheads.

Consider the case where it is desired to stitch together image data printed using a plurality of printheads 30 in a particular printing module 12 as illustrated in FIG. 2. As the receiver medium 14 moves past the printing module 12 in the receiver-medium direction 16 (i.e., the "in-track direction"), a particular in-track position on the receiver medium 14 will pass underneath the nozzles of the printheads 30 at different times. The printed image data formed by the different printheads 30 can be aligned by using appropriate time delays between the times that the image data is sent to the different printheads 30. Nominal time delays can be determined given a knowledge of the nominal transport velocity of the receiver medium 14 and the nominal positions of the printheads 30. However, due to manufacturing tolerances in the positions of the various system components, as well as other factors such as interactions with the printer environment (e.g., thermal expansion of system components and air currents that can affect the trajectory of ejected drops), alignment errors will typically result when images are printed using the nominal time delays.

Figure 3:
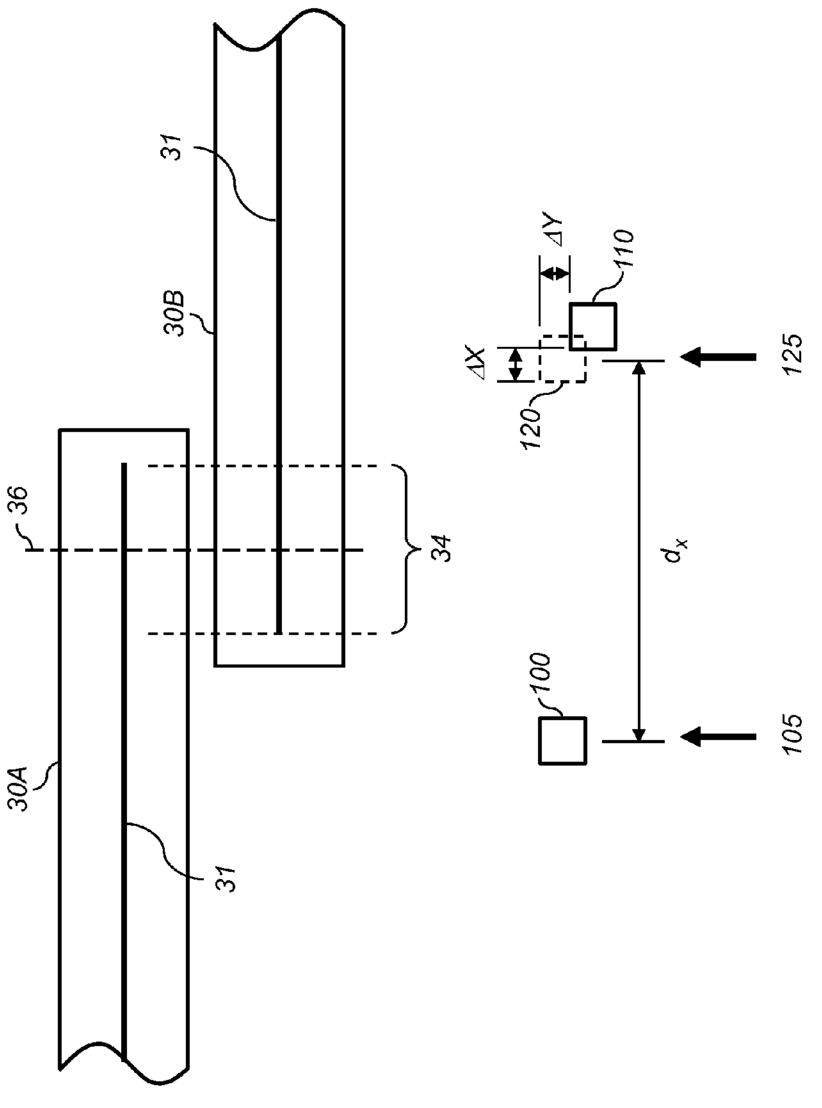
FIG. 3 (Prior Art)
FIG. 3 shows a test pattern used in a prior art alignment process.

The aforementioned U.S. Pat. No. 8,123,326 by Saettel et al. describes a calibration method, which is illustrated in FIG. 3, that can be used to align image data printed by different printheads 30A and 30B. The printheads 30A and 30B in this example belong to a single printing module 12 (FIG. 2) and are stitched together to form a wider printing zone. The printheads 30A and 30B overlap in overlap region 34 centered on centerline 36. A test pattern is printed that includes a first test mark 100 printed at a first cross-track position 105 using nozzles in the nozzle array 31 in the first printhead 30A. Likewise, a second test mark 110 is printed using nozzles in the nozzle array 31 in the second printhead 30B. In a perfectly aligned system, the second test mark 110 would be printed at an intended second test mark location 120 at a second cross-track position 125 that is separated by a nominal cross-track separation $d_x$ from the first cross-track position 105. In this example, the first test mark 100 and the second test mark 110 are nominally printed at the same in-track position, although this is not required.

An image of the printed test pattern is captured using a digital image capture device and is analyzed to determine the locations of the first test mark 100 and the second test mark 110 (e.g., by detecting the printed test marks and then determining centroids of the detected test marks). The intended second test mark location 120 can be determined by incrementing the cross-track position by the nominal cross-track separation $d_x$ to the right of the first test mark location 100. The alignment error can then be characterized by determining a difference between the location of the second test mark 110 and the intended second test mark location 120. The alignment error will have two components: a cross-track position error $\Delta X$ and an in-track position error $\Delta Y$.

Once the alignment error has been determined, it can be corrected using a number of different mechanisms. In some implementations, the cross-track position error $\Delta X$ can be corrected by shifting the swath of image data printed by one or both of the printheads 30A and 30B in the cross-track direction. This will have the effect of shifting which nozzles are used to print the image data sent to the printheads 30A and 20B. In other implementations, the cross-track position error $\Delta X$ can be corrected using other mechanisms, such as by adjusting a physical position of at least one of the printheads 30A and 30B.

The in-track position error $\Delta Y$ can be corrected by adjusting a timing delay between when image data is printed using the first printhead and when corresponding image data is printed using the second printhead. In other embodiments, the in-track position error $\Delta Y$ can be corrected using other mechanisms, such as by shifting the swath of image data printed by one or both of the printheads 30A and 30B in the in-track direction, or by adjusting a physical position of at least one of the printheads 30A and 30B.

While this approach can correct for a large portion of the alignment errors, the Inventors have found that artifacts can be formed at the boundaries between the image data printed by the different printheads in many cases. Consider the example shown in FIG. 4A which illustrates a first printed linear feature 130 formed by printing drops from each of the nozzles in the first printhead 30A (FIG. 3), and a second printed linear feature 140 formed by printing drops from each of the nozzles in the first printhead 30B (FIG. 3) using a nominal time delay. The printed linear features 130 and 140 overlap in overlap region 34 where the nozzle arrays 31 (FIG. 3) overlap.

While the nozzle arrays 31 (FIG. 3) in the printheads 30A and 30B are nominally arranged is straight horizontal arrays, it has been observed that the printed linear features 130 and 140 typically deviate from this pattern to some extent. These deviations can result from a number of different causes. For example, any skew of the nozzle arrays 31 so that they are not perfectly perpendicular to the receiver motion direction 16 (FIG. 2) will result in the printed linear features 130 and 140 being tilted relative to the cross-track direction.

Roll-fed inkjet printing systems typically use a "continuous inkjet" arrangement wherein the nozzles continuously eject a curtain of drops, and wherein non-printing drops are deflected into a gutter so that they do not reach the receiver medium 14. In some printer arrangements, the size of the ink drops is controlled so that the non-printing drops are smaller than the printing drops. When the ink drops pass through an air stream, the smaller non-printing drops are deflected to a larger degree so that they fall into the gutter, whereas the larger printing drops miss the gutter and fall onto the receiver medium 14. Aerodynamic effects caused by interaction of the air stream and the ink drops can cause non-uniform deflections of the ink drops, particularly near the ends of the nozzle arrays 31. This can introduce curvature into the printed features as can be seen near the ends of the printed linear features 130 and 140 in FIG. 4A.

If the above-described method is used to determine the alignment error by printing test marks at the first cross-track position 105 and the second cross-track position 125, and in-track position error $\Delta Y$ can be determined. FIG. 4B illustrates the case where the in-track position error $\Delta Y$ is corrected by adjusting the time delay between when the image data is printed by the printheads 30A and 30B. In this case, ink drops from the nozzles in the printhead 30A that extend to the right of stitch boundary 150 and ink drops from the nozzles in the printhead 30B that extend to the left of the stitch boundary 150 are not printed so as to stitch the printed linear features 130 and 140 together to form what should nominally be a single continuous horizontal line. It can be seen that the printed linear features 130 and 140 are properly aligned in the in-track direction at the first cross-track position 105 and the second cross-track position 125. However, at other cross-track positions the alignment is not perfect due to the skew and curvature of the printed linear features 130 and 140. Notably, there is a residual misalignment at the stitch boundary 150 producing a discontinuity in the printed line having an in-track stitch position error $\Delta Y_S$. Human observers are able to detect even small amounts of discontinuity in printed lines and edges. As a result, any residual misalignment at the stitch boundary 150 can produce objectionable artifacts in the printed images.

One way to minimize discontinuity artifacts at the stitch boundary 150 is to print the first test mark 100 and the second test mark 110 as close to the stitch boundary 150 as possible. However, in practice there is a limit on how close they can be printed while insuring that they can be reliably identified in the analysis process. Another approach would be to print both the first test mark 100 and the second test mark 110 in the overlap region 34 at the same cross-track (x) position, while separating them by a nominal separation in the in-track direction ($d_y$). Then, any deviation from the expected nominal in-track separation can be attributed to the in-track position error $\Delta Y_S=(Y_{f2}-Y_{f1})-d_y$, where $Y_{f1}$ is the detected in-track position of the first test mark 100 and $Y_{f2}$ is the detected in-track position of the second test mark 101. The problem with this approach is that it requires an accurate knowledge of the magnification of the camera system in order to map the pixels in the captured digital image of the test pattern to distances on the printed image. Even small errors in the expected magnification can introduce large errors in the calculated in-track stitch position error $\Delta Y_S$. In practice, the magnification can vary significantly, even during the printer operation, to the extent that it is typically impractical to use this approach to accurately correct for the in-track alignment errors.

Figure 5:
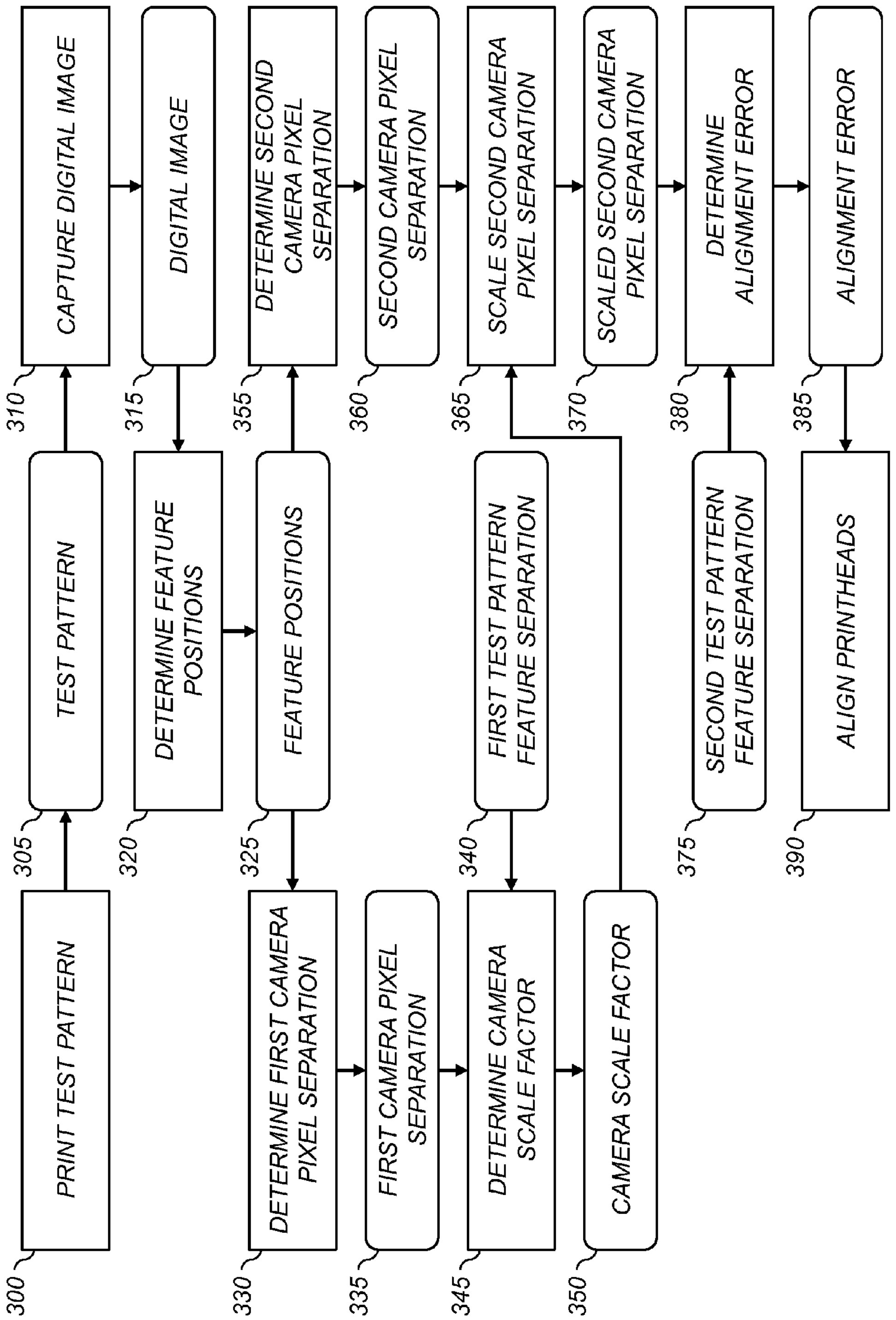
FIG. 5 is a flowchart of an alignment process in accordance with the present invention.

FIG. 5 shows a flowchart of an improved method for aligning image data printed using a multi-printhead printer in accordance with a preferred embodiment. The method makes use of one or more pairs of features printed by a single printhead to accurately determine the magnification of the imaging process used to capture the test pattern image. The determined magnification is then used to accurately scale the separation between features printed with different printheads in order to accurately assess the alignment errors between the printheads.

First, a print test pattern step 300 is used to print a test pattern 305 including a plurality of features on receiver medium 14 (FIG. 1) using the multi-printhead printing system. In a preferred embodiment, the multi-printhead printing system is a web-fed printing system that prints on the receiver medium 14 as the receiver medium 14 is moved relative to the printheads 30 (FIG. 1) in an in-track direction.

Figure 6:
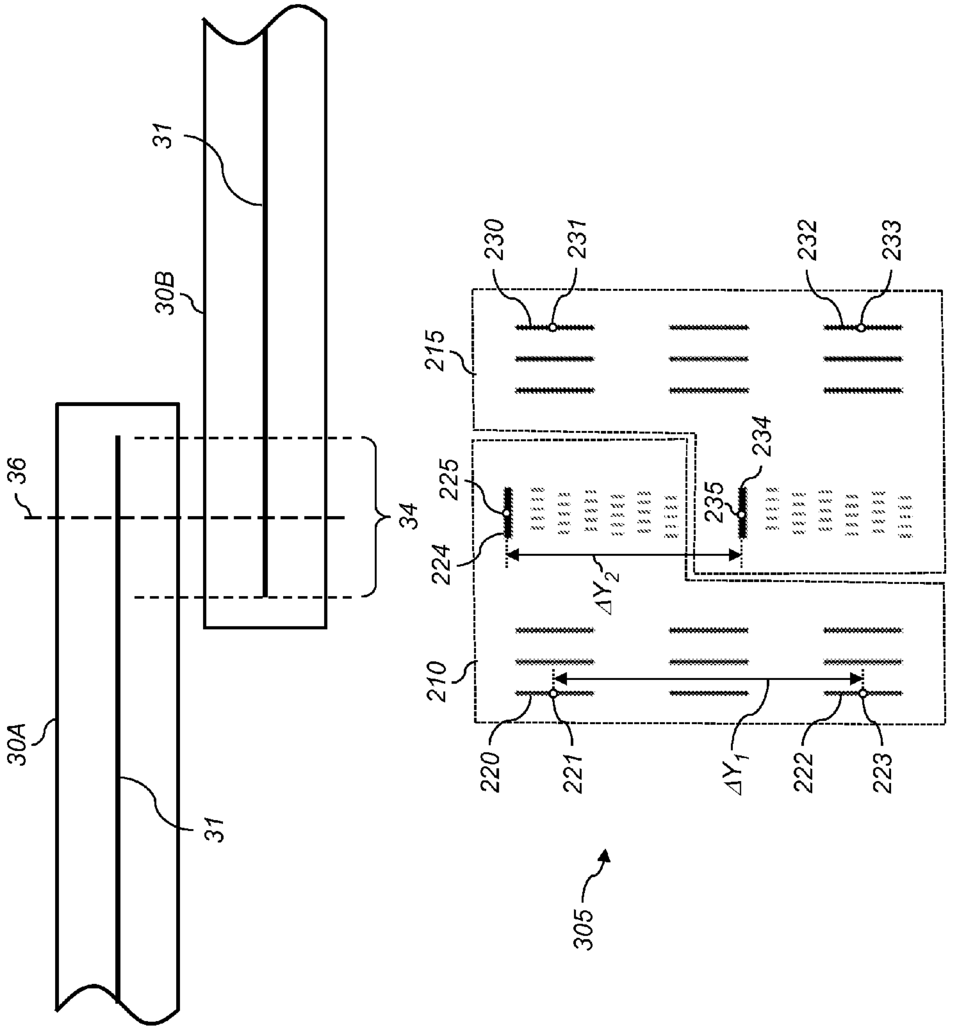
FIG. 6 shows an exemplary test pattern that can be used in accordance with the present invention.

FIG. 6 shows an exemplary test pattern 305 appropriate for use in accordance with the present invention. Some of the features in the test pattern 305 (i.e., first printhead features 210) are printed with first printhead 30A and some of the features in the test pattern 305 (i.e., second printhead features 215) are printed with second printhead 30B. The first printhead features 210 include some "near-field" features (e.g., feature 224) that are printed by nozzles in overlap region 34, as well as some "far-field" features (e.g., features 220 and 222) that are printed outside of the overlap region 34. Likewise, the second printhead features 215 include some "near-field" features (e.g., feature 234) that are printed by nozzles in overlap region 34, as well as some "far-field" features (e.g., features 230 and 232) that are printed outside of the overlap region 34.

In the following exemplary embodiment, the alignment method of FIG. 5 is used to align two printheads 30 within a printing module (FIG. 2) that print the same color ink. In this case, the first printhead features 210 and the second printhead features 215 (at least the features that are used in the present analysis) will be printed with the same color ink. In other embodiments, the first printhead features 210 can be printed using a printhead 30A that prints a first color ink and the second printhead features 215 can be printed using a printhead 30B that prints a second color ink. This can facilitate correction of color-to-color alignment errors. In some embodiments, the first printhead features 210 are printed with a plurality of different color inks (e.g., using printheads 30 in a plurality of printing modules 12), and likewise the second printhead features 215 are printed with a plurality of different color inks. In this way, the same test pattern 305 can be used to correct for both stitching alignment errors, as well as color-to-color alignment errors. In this case, the method of the present invention can be applied to an appropriate subset of the features to perform each of the alignment processes.

A capture digital image step 310 is used to capture an image of the test pattern 305 to provide digital image 315. In a preferred embodiment, the capture digital image step 310 is performed in real-time using one of the imaging devices 22 in an imaging system 20 that is incorporated into the printing system 10 (see FIG. 1). In other embodiments, the capture digital image step 310 can be performed using an off-line imaging system. As discussed earlier, the imaging device 22 can be digital camera systems adapted to capture 2-D images of the receiver medium 14. Alternately, the imaging device 22 can use a 1-D linear sensor to capture the digital image 315 on a line-by-line basis as the receiver medium 14 moves past the imaging device 22.

The features in the test pattern 305 have predefined positions and are separated by predefined test pattern feature separations. The test pattern feature separations are typically defined by a horizontal (i.e., cross-track) feature separation and a vertical (i.e., in-track) feature separation. The test pattern feature separations can be defined in a variety of different reference points on the features. In a preferred embodiment, the test pattern feature separations are defined relative to the centroids of the features (e.g., feature centroids 221, 223, 225, 231, 233 and 235 in FIG. 6). In other embodiments, the test pattern feature separations can be defined relative to other feature locations (e.g., the top-right corners of the features). In a preferred embodiments, the test pattern feature separations are defined in units of test pattern pixels. In other embodiments, the test pattern feature separations can be defined in terms of other units such as physical distances (e.g., mm) on the receiver medium 14, or a number of encoder pulses for the drive system used to move the receiver medium 14 through the printing system 10.

Returning to a discussion of FIG. 5, a determine feature positions step 320 is used to analyze the digital image 315 to determine feature positions 325 for each of the relevant features in the test pattern 305. The feature positions 325 are preferably represented in units of pixel coordinates in the digital image 315, although they can equivalently be represented in other coordinate systems as well. For the purposes of the present discussion, the feature positions will be referred to as "camera pixel positions" without any loss of generality.

In a preferred embodiment, the determine feature positions step 320 determines the feature positions by performing a feature detection process to detect the individual features in the digital image 315. Any feature detection process known in the art can be used in accordance with the present invention. In a preferred embodiment the feature detection process applies a threshold to the captured image to better discern dark pixels from light pixels. Clusters of dark pixels that touch one another are then detected for the case of dark features on a light background. Alternatively, it is also possible to identify light features on a dark background. Once the features have been identified, the feature positions 325 are determined by determining the location of an appropriate reference point on each feature. In a preferred embodiment, the centroids of the features are computed to define the feature positions 325.

A determine first camera pixel separation step 330 is used to determine at least one first camera pixel separation 335 between a pair of features (e.g., features 220 and 223 in FIG. 6) printed with the first printhead 30A. The first camera pixel separation 335 is determined by computing a difference between the feature positions for the pair of features. For the case where the method of the present invention is used to correct for in-track alignment errors, the relevant separation will be in the position difference $\Delta Y_1$ in-track direction:

$$\Delta Y_1 = Y_{f2} - Y_{f1} \tag{1}$$

where $Y_{f1}$ and $Y_{f2}$ are the feature position for the first and second features. For the case where the method of the present invention is used to correction for cross-track alignment errors, position differences in the cross-track direction can be computed in a similar fashion.

In some embodiments, first camera pixel separations 335 can be determined for a plurality of pairs of features printed with the first printhead 30A. Additional first camera pixel separation 335 can also be determined for pairs of features printed by the second printhead 30B (e.g., features 230 and 233 in FIG. 6). The important feature is that each pair of features that are used to determine the first camera pixel separations 335 should be printed with the same printhead 30A or 30B.

Next, a determine camera scale factor step 345 is used to determine a camera scale factor 350 responsive to the first camera pixel separation 335 ($\Delta Y_1$) and a corresponding first test pattern feature separation 340 ($d_{y1}$) for the pair of features. The camera scale factor 350 is a multiplicative factor that can be used to scale pixel separations in the digital image 315 to determine corresponding test pattern separations (e.g., in units of test pattern pixels).

For the case where the method of the present invention is used to correct in-track alignment errors, the camera scale factor 350 (M) can be determined using the following equation:

$$M = d_{y1} / \Delta Y_1 \tag{2}$$

For embodiments where first camera pixel separations 335 are determined for a plurality of pairs of features, camera scale factors 350 ($M_i$) can be determined for each of the pairs of features, and can be averaged to determine an overall camera scale factor 350:

$$M = \frac{1}{N_1} \sum_{i=1}^{N_1} M_i = \frac{1}{N_1} \sum_{i=1}^{N_1} (d_{y1,i} / \Delta Y_{1,i}) \tag{3}$$

where $\Delta Y_{1,i}$ is the first camera pixel separation 335 and $d_{y1,i}$ is the corresponding first test pattern feature separation 340 for the $i^{th}$ pair of features, and $N_1$ is the number of pairs of features.

A determine second camera pixel separation step 355 is used to determine at least one second camera pixel separation 360 between a first feature printed with the first printhead 30A (e.g., feature 224 in FIG. 6) and a second feature printed with the second printhead 30B (e.g., feature 234 in FIG. 6). The second camera pixel separation 360 is determined by calculating a feature separation in a manner analogous to that discussed earlier with respect to the determination of the first camera pixel separation 335. In a preferred embodiment the pair of features (e.g., features 224 and 234) are located in the overlap region 34 at the same nominal cross-track position. This has the advantage that the alignment errors are determined in the vicinity of the stitch boundary 150 (FIG. 4B) where the alignment errors are most visible to an observer.

For the case where the method of the present invention is used to correct for in-track alignment errors, the relevant separation will be in the position difference $\Delta Y_2$ in-track direction:

$$\Delta Y_2 = Y_{F2} - Y_{F1} \tag{4}$$

where $Y_{F1}$ is the feature position for the first feature printed with the first printhead 30A and $Y_{F2}$ is the feature position for the second feature printed with the second printhead 30A. In some embodiments, second camera pixel separations 360 can be determined for a plurality of pairs of features. This has the advantage that it can improve accuracy by providing a plurality of estimates of the alignment error which can be averaged to reduce variability.

A scale second camera pixel separation step 365 is used to determine a scaled second camera pixel separation 370 ($D_{y2}$) by scaling the second camera pixel separation 360 ($\Delta Y_2$) using the camera scale factor 350 (M). In a preferred embodiment, this is performed using a simple multiplication operation:

$$D_{y2} = M \cdot \Delta Y_2 \tag{5}$$

For embodiments where second camera pixel separations 360 ($\Delta Y_{2,i}$) are determined for a plurality of pairs of features, second camera pixel separations 370 ($D_{y2,i}$) can be determined for each pair of features.

A determine alignment error step 380 is now used to determine an alignment error 385 by comparing the scaled second camera pixel separation 370 ($D_{y2}$) to a corresponding second test pattern feature separation 375 ($d_{y2}$) which specifies the nominal separation that would be expected if there were no alignment error. In a preferred embodiment, the alignment error is determined by computing a simple difference. For the case where the method of the present invention is used to correct for an in-track alignment error, the alignment error 385 will be an in-track position error ($\Delta Y$):

$$\Delta Y = d_{y2} - D_{y2} \tag{6}$$

For embodiments where second camera pixel separations 360 are determined for a plurality of pairs of features, alignment errors 385 ($\Delta Y_i$) can be determined for each of the pairs of features, and can be averaged to determine an overall alignment error 385:

$$\Delta Y = \frac{1}{N_2}\sum_{i=1}^{N_2} \Delta Y_i = \frac{1}{N_2}\sum_{i=1}^{N_2} (d_{y2,i} - D_{y2,i}) \tag{7}$$

where $D_{y2,i}$ is the scaled second camera pixel separation 370 and $d_{y2,i}$ is the corresponding second test pattern feature separation 375 for the $i^{th}$ pair of features, and $N_2$ is the number of pairs of features.

Once the alignment error 385 has been determined, an align printheads step 390 is used to align the image data printed with the printheads 30A and 30B so as to compensate for the alignment error 385. In a preferred embodiment, the printheads 30A and 30B are aligned by adjusting the image data that is sent to at least one of the printheads 30A and 30B. For the case where the alignment error 385 is an in-track alignment error, the alignment can be corrected by adjusting a timing delay between when corresponding image data is printed using the first printheads 30A and the second printhead 30B. For the case where the alignment error 385 is a cross-track alignment error, the alignment error 385 can be corrected by shifting the image data sent to a least one of the printheads 30A and 30B in a cross-track direction (i.e., either left or right). This has the effect of using a different set of nozzles in the overlap region so that the last nozzles used in both printheads are properly aligned relative to the stitch boundary 150 (FIG. 4B). In other embodiments, a physical position of at least one of the printheads 30A and 30B is adjusted to provide the improved alignment.

In some cases, the first and second printheads 30 being aligned are in a single printing modules 12. In other cases, the first and second printheads 30 being aligned are in different printing modules 12 (e.g., to perform color-to-color alignment).

Figure 4A:
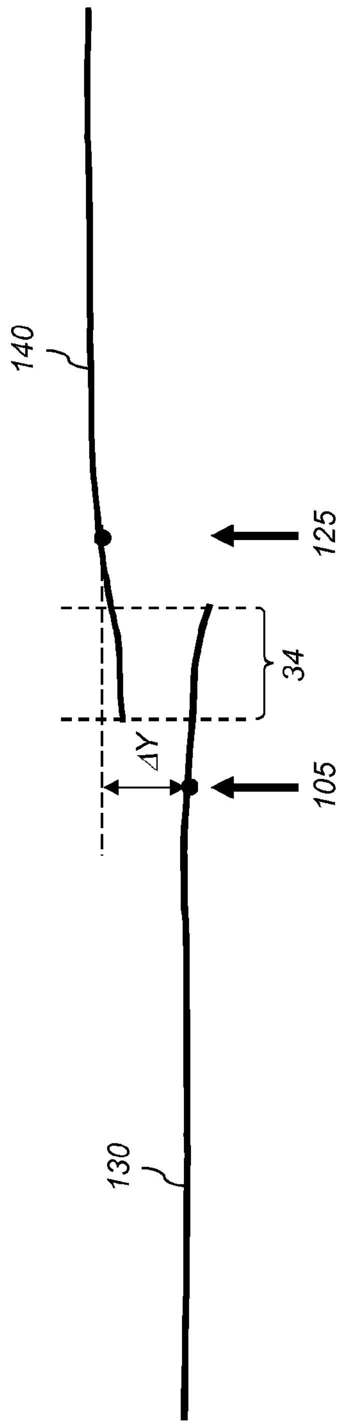
FIG. 4A illustrates linear features printed by a misaligned printer.
Figure 4B:
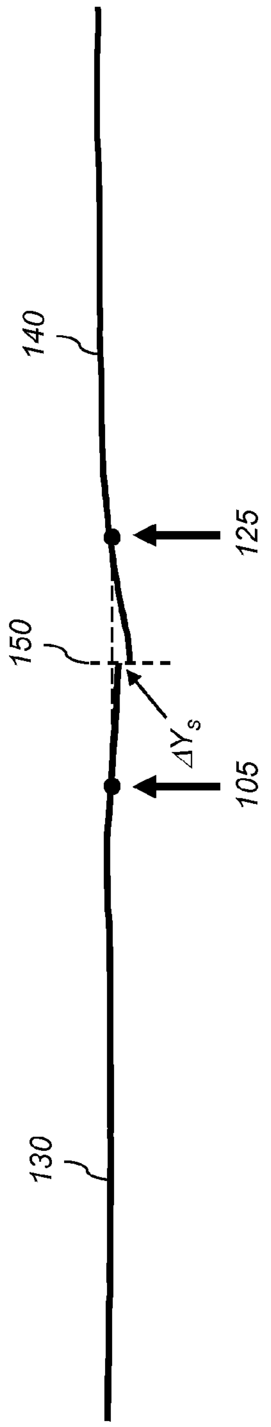
FIG. 4B illustrates linear features printed using a printer aligned using a prior art alignment process.
Figure 7:
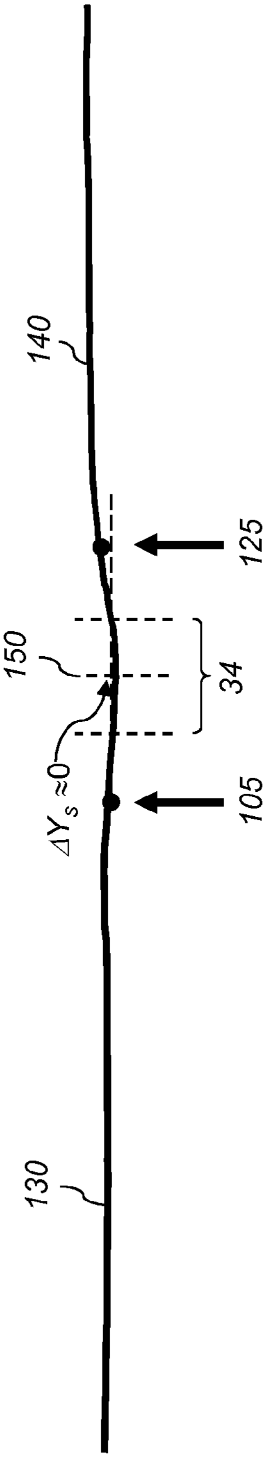
FIG. 7 illustrates linear features printed using a printer aligned using the alignment process of FIG. 5.

FIG. 7 shows an example of an aligned image with printed linear features where the method of FIG. 5 was used to determine the in-track alignment error for the misaligned system of FIG. 4A. Comparing this image to that shown in FIG. 4B, which was aligned using a prior art method, it can be seen that the in-track stitch position error $\Delta Y_S$ has been reduced to a negligible level. While the alignment error between the first cross-track position 105 and the second cross-track position 125 is somewhat larger than in FIG. 4B, this error is much less visible to a human observer because of the physical separation between these points.

In some embodiments, the method of the present invention is used to determine the alignment error 385 during a calibration process, which is performed before a job is printed. Appropriate adjustments can then be made to correct for the alignment error 385 when the job is printed. The calibration process can be performed on various schedules. For example, it can be performed whenever a different type of receiver medium 14 is loaded into the printing system 10. In some cases, the calibration process can be performed on a regular schedule (e.g., at the start of each day, or before each new print job). The calibration process can also be performed on an as needed basis whenever an operator determines that the printed images contain significant misalignment.

In some embodiments, a plurality of test patterns 305 are printed during the calibration process, and the alignment error 385 can be determined by combining the results obtained from the set of test patterns 305. For example, alignment errors 385 can be determined individually from each of the printed test patterns 105, and then they can be combined to determine average spatial alignment error 385. This approach has the advantage that it will be less sensitive to process variability.

In some embodiments, test patterns 305 are printed at regular intervals during the printing process and scanned using an in-line imaging system 20. Accordingly, the alignment can be adjusted in real time if any changes in the alignment error 385 are detected. In some embodiments, the alignment error 385 can be updated based completely on the most recently printed test pattern 305. In other embodiments, the results of the most recently printed test pattern 305 can be combined with the results from one or more previously printed test patterns 305 (e.g., by performing a moving average of the detected test pattern indicia locations 125, or by performing a moving average of the determined alignment errors 385).

In some embodiments, the imaging system 20 may only include imaging devices 22 that are positioned to image a subset of the overlap regions 34 (FIG. 6) between the printheads 30 (FIG. 2) at any given time. In some embodiments, the imaging devices 22 can be manually or automatically moved to different locations to determine alignment errors 385 between different pairs of printheads 30.

The present invention has been described with respect to an embodiment where in-track alignment errors are corrected for two adjacent printheads 30A and 30B in a printing module 12 of a web-fed printing system 10. It will be obvious to one skilled in the art that the method can be easily adapted to correct for other types of alignment errors and for use with other types of multi-printhead printing systems. For example, in some embodiments, the method of the present invention can be used to correct for cross-track alignment errors for two adjacent printheads 30A and 30B in a printing module 12 of a web-fed printing system 10. In this case, the second camera pixel separation 360 and the corresponding second test pattern feature separation 375 will be in the cross-track direction. (In this case, the camera scale factor 350 can be determined using pairs of features that are separated in either the cross-track direction or the in-track directions, or both.) In some embodiments, the method of the present invention can be used to correct for color-to-color alignment errors in a color printer. In this case, the printheads 30A and 30B can print different colors and can be located in different printing modules 12 (FIG. 1).

While the described exemplary embodiment describes the case where the printheads 30A and 30B print adjacent swaths of image data, this is not a requirement. In some embodiments, the printheads 30A and 30B can be in the same printing module 12 but can print non-adjacent swaths of data. In other embodiments, the printheads 30A and 30B can be in different printing modules 12, and can either be arranged to print image data in the same or different swath positions.

In an alternate embodiment, the method of the present invention can be used in a printing system 10 that uses a reciprocating printhead that traverses back and forth across the receiver medium 14 to print individual swaths of image data. In this case, the same printhead can be used to print each swath, and the method of the present invention can be used to align the image data printed in one swath with the image data printed in another swath.

In a preferred embodiment, the printing system 10 (FIG. 1) includes a data processing system that is used to perform the method of the present invention. The method can be performed using a computer program product stored on a memory system. The memory system can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more data processing systems to practice the method according to the present invention.

The invention has been described in detail with particular reference to certain preferred embodiments thereof, but it will be understood that variations and modifications can be effected within the spirit and scope of the invention.

PARTS LIST

10 printing system
12 printing module
14 receiver medium
16 receiver motion direction
18 dryer
20 imaging system
22 imaging device
30 printhead
30A printhead
30B printhead
31 nozzle array
32 printing region
34 overlap region
36 centerline
100 first test mark
105 first cross-track position
110 second test mark
120 intended second test mark location
125 second cross-track position
130 printed linear feature
140 printed linear feature
150 stitch boundary
210 first printhead features
215 second printhead features
220 feature
221 feature centroid
222 feature
223 feature centroid
224 feature
225 feature centroid
230 feature
231 feature centroid
232 feature
233 feature centroid
234 feature
235 feature centroid
300 print test pattern step
305 test pattern
310 capture digital image step
315 digital image
320 determine feature positions
325 feature positions
330 determine first camera pixel separation step
335 first camera pixel separation
340 first test pattern feature separation
345 determine camera scale factor step
350 camera scale factor
355 determine second camera pixel separation step
360 second camera pixel separation
365 scale second camera pixel separation step
370 scaled second camera pixel separation
375 second test pattern feature separation
380 determine alignment error step
385 alignment error
390 align printheads step
$d_x$ nominal cross-track separation
$d_{y1}$ first test pattern feature separation
$d_{y2}$ second test pattern feature separation
$D_{y2}$ scaled second camera pixel separation
M camera scale factor $Y_{f1}$ feature position
$Y_{f2}$ feature position
$Y_{F1}$ feature position
$Y_{F2}$ feature position
$\Delta X$ cross-track position error
$\Delta Y$ in-track position error
$\Delta Y_S$ in-track stitch position error
$\Delta Y_1$ first camera pixel separation
$\Delta Y_2$ second camera pixel separation

The invention claimed is:

1. A multi-printhead printing system, comprising:

first and second printheads adapted to print on a receiver medium;

a transport system adapted to move the receiver medium relative to the first and second printheads in an in-track direction;

a digital image capture device;

a data processing system;

a memory system communicatively connected to the data processing system and storing instructions configured to cause the data processing system to implement a method for aligning image data printed on the receiver medium using the first and second printheads:

printing a test pattern including a plurality of features on the receiver medium using first and second printheads as the receiver medium is moved relative to the printheads in the in-track direction, wherein some of the features in the test pattern are printed with the first printhead and some of the features in the test pattern are printed with the second printhead, wherein the features in the test pattern are separated by predefined test pattern feature separations;

capturing a digital image of the printed test pattern on the receiver medium using the digital image capture device;

analyzing the captured digital image to determine a first camera pixel separation between two features printed with the first printhead;

determining a camera scale factor responsive to the determined first camera pixel separation and the corresponding test pattern feature separation;

analyzing the captured digital image to determine a second camera pixel separation between a feature printed with first printhead and a feature printed with the second printhead;

using the determined camera scale factor to scale the second camera pixel separation;

comparing the scaled second camera pixel separation to the corresponding predefined test pattern feature separation to determine an alignment error; and using the determined alignment error to adjust the alignment of image data printed with at least one of the first and second printheads.

2. The multi-printhead printing system of claim 1, wherein alignment of the printed image data in the in-track direction is adjusted by adjusting a timing delay between when the image data is printed using the first printhead and when corresponding the image data is printed using the second printhead.

3. The multi-printhead printing system of claim 1 wherein alignment of the printed image data is adjusted by adjusting a physical position of at least one of the first and second printheads.

4. The multi-printhead printing system of claim 1 wherein alignment of the printed image data in a cross-track direction is adjusted by shifting the image data printed by at least one of the first and second printheads, wherein the cross-track direction is perpendicular to the in-track direction.

5. The multi-printhead printing system of claim 1 wherein the first and second printheads print adjacent swaths of image data.

6. The multi-printhead printing system of claim 5 wherein the adjacent swaths have an overlap region where the adjacent swaths overlap in a cross-track direction that is perpendicular to the in-track direction, and wherein the features analyzed to determine the second camera pixel separation are printed in the overlap region.

7. The multi-printhead printing system of claim 6 wherein the features analyzed to determine the second camera pixel separation are printed at the same nominal position in the cross-track direction.

8. The multi-printhead printing system of claim 5 wherein the first and second printheads print are in a single printing module that spans the receiver medium in a cross-track direction that is perpendicular to the in-track direction by stitching together a plurality of printheads.

9. The multi-printhead printing system of claim 1 wherein the printer is a color printer adapted to print a plurality of color channels, and wherein the first and second printheads print different color channels.

* * * * *